US006639901B1

United States Patent
Katzri et al.

(10) Patent No.: US 6,639,901 B1
(45) Date of Patent: Oct. 28, 2003

(54) APPARATUS FOR AND METHOD FOR SUPPORTING 802.1Q VLAN TAGGING WITH INDEPENDENT VLAN LEARNING IN LAN EMULATION NETWORKS

(75) Inventors: Lior Katzri, Givaataim (IL); Opher Yaron, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/490,750

(22) Filed: Jan. 24, 2000

(51) Int. Cl.[7] .................. H04L 12/28; G06F 15/173
(52) U.S. Cl. ................ 370/255; 370/395.1; 370/396; 370/409; 709/238
(58) Field of Search .................. 370/255, 256, 370/352, 389, 395.1, 396, 397, 400, 401, 409, 404; 709/201, 203, 238, 249, 220, 223

(56) References Cited

U.S. PATENT DOCUMENTS

| | | | | |
|---|---|---|---|---|
| 5,581,552 A | * | 12/1996 | Civanlar et al. | 370/396 |
| 5,600,644 A | * | 2/1997 | Chang et al. | 370/404 |
| 5,805,805 A | * | 9/1998 | Civanlar et al. | 709/220 |
| 5,949,783 A | * | 9/1999 | Husak et al. | 370/396 |
| 6,085,238 A | * | 7/2000 | Yuasa et al. | 709/223 |

OTHER PUBLICATIONS

CISCO IOS Switching Services Configuration Guide, LAN Emulation Overview, pp. XC-59-65.
LAN Emulation Over ATM Version 2—LUNI Specification—Letter Ballot, AF-LANE-0084.000, pp. 25-26, 29-33, 88-101.
LAN Emulation Over ATM, 1996, pp. 1-11.
IEEE Standards for Local and Metropolitan Area Networks: P802.1Q/D11, Jul. 30, 1998, pp. 28-32, 38-76, 80-84, 158-165.

* cited by examiner

Primary Examiner—Alpus H. Hsu
Assistant Examiner—Afsar M. Qureshi
(74) Attorney, Agent, or Firm—Howard Zaretsky (57) ABSTRACT

An apparatus for and a method of extending the ATM Forum LAN Emulation standard to support 802.1Q VLAN tagging with Independent VLAN Learning. A standard LEC entity is modified to perform the VLAN tagging method that supports Independent VLAN Learning. Since the LES may also respond to LE_ARP messages, it is optionally modified to perform the VLAN tagging method of the invention so as to provide support for 802.1Q Independent VLAN Learning. Support for 802.1Q Independent VLAN Learning is provided by adding a VLAN-ID TLV to LAN Emulation control messages such as LE_ARP and LE_REGISTER messages. The TLV added comprises the VLAN Tag Header information that is normally carried by the Ethernet frame in 802.1Q networks.

18 Claims, 7 Drawing Sheets

APPARATUS FOR AND METHOD FOR SUPPORTING 802.1Q VLAN TAGGING WITH INDEPENDENT VLAN LEARNING IN LAN EMULATION NETWORKS

FIELD OF THE INVENTION

The present invention relates generally to data communications networks and more particularly relates to an apparatus and related method for supporting 802.1Q independent VLAN learning in a LAN Emulation over Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as Interim Inter-Switch Signaling Protocol (USP). The goal of the PNNI specifications is to provide customers of ATM network equipment some level of multi-vendor interoperability.

LAN Emulation

Today, most data traffic in existing customer premisis networks travels over legacy LANs. It is desirable to permit these legacy LANs and their embedded infrastructure to operate with new ATM networks currency being deployed. To enable an easier migration path to ATM, the ATM Forum has defined the LAN Emulation (LANE) specification that allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Figure 1:
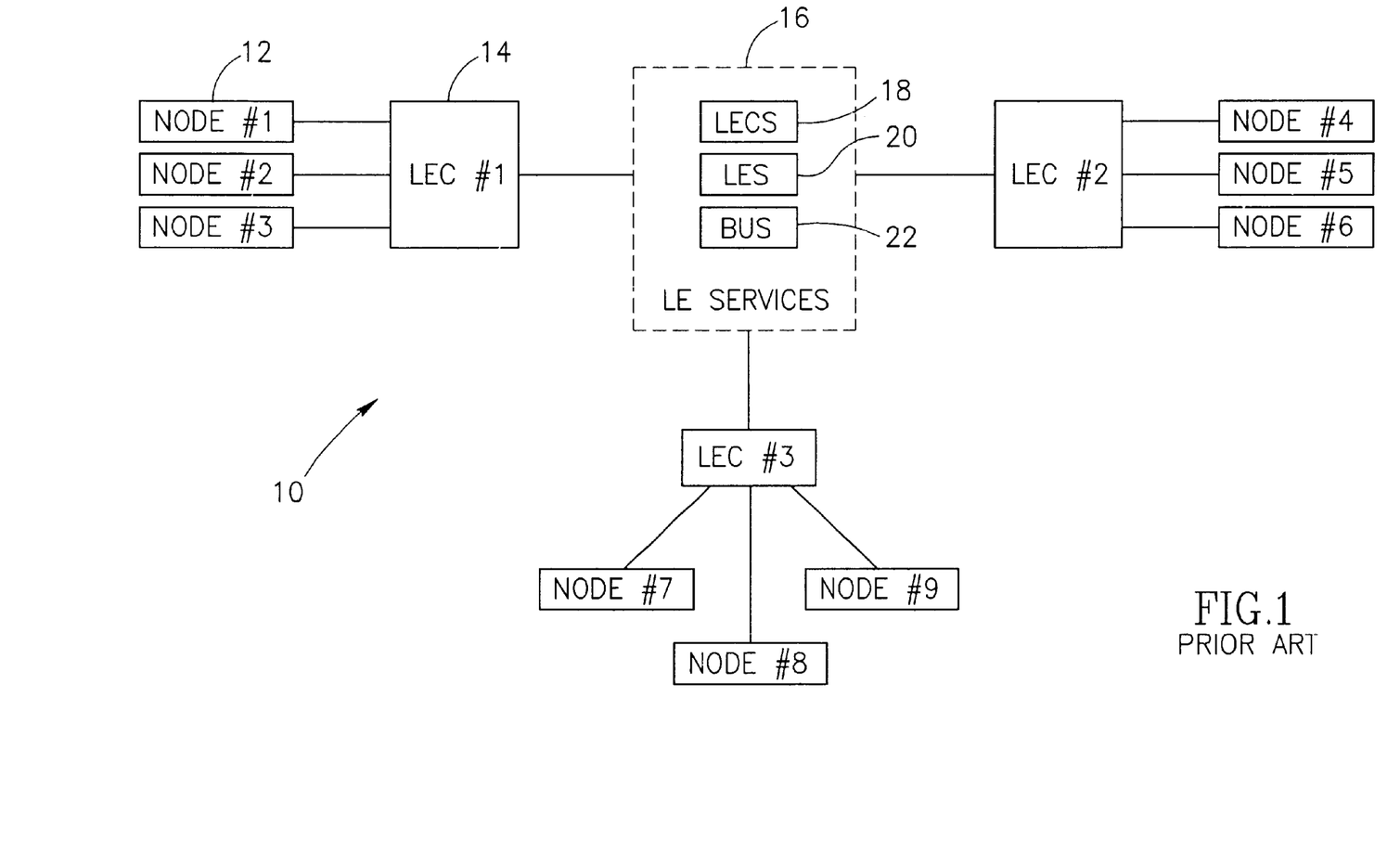
FIG. 1 is a block diagram illustrating prior art Version 1.0 LAN Emulation services available to nodes in an ATM network.

The ATM Forum's LANE standard entitled, "LAN Emulation over ATM Networks," Versions 1.0 and 2.0, incorporated herein by reference in its entirety, defines the LANE architect and a set of protocols used by the LANE entities. LANE uses a client/server model to provide its services. A block diagram illustrating prior art Version 1.0 LAN Emulation services available to nodes in an ATM network is shown in FIG. 1. The network, generally referenced 10, comprises an ATM network cloud (not shown) which includes a plurality of LECs 14 labeled LEC #1 through LEC #3 and a plurality of nodes 12 labeled node #1 through node #9 connected to LECs #1 through #3. The LECs are connected to a LAN Emulation services block 16 which comprises LECS 18, LES 20 and BUS 22.

The entities defined by the LANE architecture include LAN Emulation Clients (LECs) 14, a LAN Emulation Server (LES) 20, a Broadcast and Unknown Server (BUS) 22 and LAN Emulation Configuration Server (LECS) 18. The LES, BUS and LECS constitute what is known to as the LANE Service (block 16).

Each LAN Emulation Client (LEC) represents a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC must first communicate with an LECS. It may utilize a specific ATM address of the LECS if it knows it, or, as is typically the case, may use the well-known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LES implements the control coordination function for the ELAN by providing a mechanism for registering and resolving unicast MAC addresses to ATM addresses. An LEC is connected to only one LES entity and may register LAN destinations it represents and multicast MAC addresses it wishes to receive. A LEC also queries its LES when the LEC needs to resolve a MAC address to an ATM address. The LES either responds directly to the LEC or forwards the query to other LECs so they may respond.

The BUS functions to sequence and distribute data sent by LECs to the broadcast MAC address 'FFFFFFFFFFFF', multicast data (to provide the connectionless data delivery characteristics of a shared network) and unicast data sent by a LEC before a data direct VCC has been established. Note that a given BUS serves only one emulated LAN. The main functions of the BUS include distributing data with multicast MAC (MMAC) addresses, initial unicast data (where the MAC address has not yet been resolved to a direct ATM connection) and to distribute data.

In operation, all LECs send data frames to the BUS entity, which is operative to serialize the frames and re-transmit them directly, or indirectly to other LECs. Note that serialization is necessary in order to prevent the cells making up the AAL5 frames originating from different sources from being interleaved. The BUS entity participates in the LE Address Resolution Protocol (LE_ARP) to enable an LEC to locate its BUS. The BUS must also handle ATM connections and manage its distribution group.

Note that the BUS entity may have multiple interfaces which support receiving and forwarding of specific multicast MAC addresses frames over multiple VCCs. In the event a LEC does not need to receive all multicast MAC address frames, it may inform the LES during initialization (in LANE Version 2.0 discussed below). The LES then selectively forwards multicast MAC addresses frames to only those LECs that have requested them.

In sum, all broadcast multicast and unknown traffic to and from a LEC passes through the BUS entity. Therefore, if the processing capabilities of the BUS are limited, a potential bottleneck may arise that severely effects the performance of the network.

The LECS contains the database used in determining which emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LECs physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down.

The LES implements the control coordination function for the ELAN. The LESs provide a facility for registering and resolving unicast and multicast MAC addresses to ATM addresses. A LEC is connected to only one LES and may register LAN destinations it represents and multicast MAC addresses it wished to receive with its LES. A LEC will also query its LES when the LEC wishes to resolve a MAC address to an ATM address, The LES either responds directly to the LEC or forwards the query to other LECs so they may respond.

Figure 2:
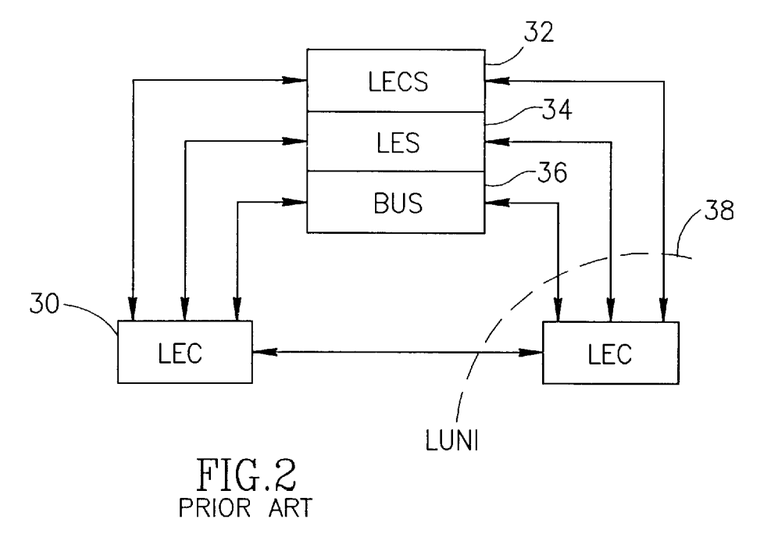
FIG. 2 is a block diagram illustrating the relationship between LEC, LECS, LES and BUS entities in prior art Version 1.0 LAN Emulation services.

A block diagram illustrating the relationship between LEC, LECS, LES and BUS entities in prior art Version 1.0 LAN Emulation services is shown in FIG. 2. Two LECs 30 are shown in communication with each other in addition to an LECS 32, LES 34 and BUS 36. The protocol the LECs use to communicate with each other and to the LAN Emulation services is known as LAN Emulation User to Network Interface (LUNI). The scope of the LUNI is indicated by the dashed line 38.

A characteristic feature of these types of implementations, however, is that when a LES fails, all the LECs connected to it try to rejoin the emulated LAN by connecting to the LECS. The LECS, however, assigns these LECs to the same non operative LES. The connection fails and the process continues endlessly.

The ATM Forum LAN Emulation Over ATM Version 2.0—LUNI Specification (af-lane-00S4.000), incorporated herein by reference in its entirety, addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECs, LESs, BUSs, etc. In addition, LNNI defines a new LAN Emulation Service entity, i.e., the Selective Multicast Server (SMS), to enhance the handling of Multicast traffic.

Figure 3:
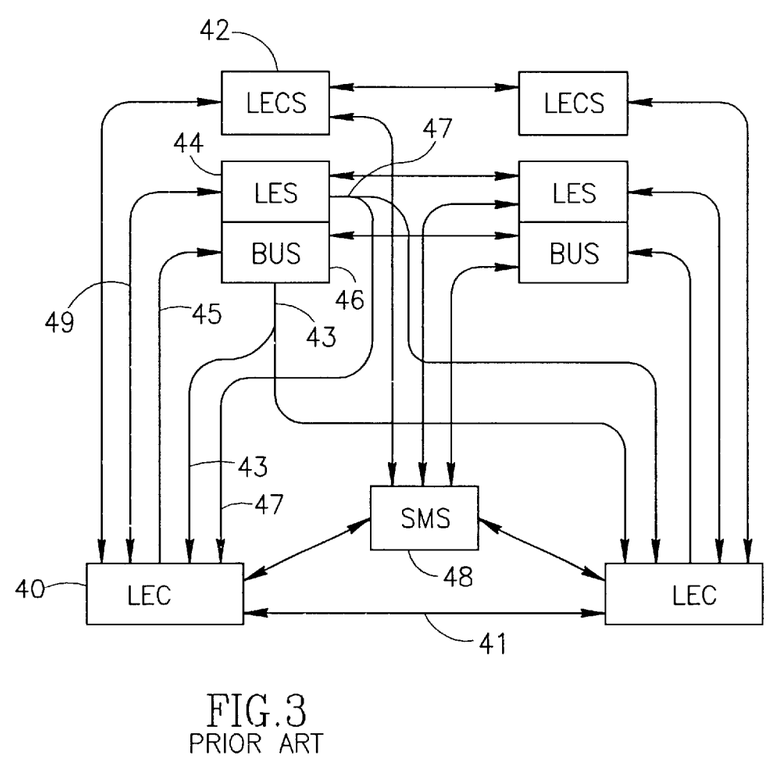
FIG. 3 is a block diagram illustrating the relationship between LEC, LECS, LES, BUS and SMS entities in prior art Version 2.0 LAN Emulation services.

A block diagram illustrating the relationship between LEC, LECS, LES, BUS and SMS entities in prior art Version 2.0 LAN Emulation services is shown in FIG. 3. Two LECs 40 are shown in communication with each other and to either of two LECS 42, LES 44 and BUS 46. In addition, both LECs and the LECS, LES and BUS communicate with a Selective Multicast Server (SMS) entity 48. Note that there can be more than one SMS per ELAN.

Communications among LANE components is normally handled via several types of SVCs, i.e., unidirectional, bidirectional, point-to-point (P2P) and point-to-multipoint (P2M), also known as VCCs. The LES communicates with each individual LEC via a control direct VCC 49 and with all LECs collectively via control distribute VCC 47; the BUS communicates with each individual LEC via a multicast send VCC 45 and with all LECs collectively via multicast forward VCC 43; and two individual LECs communicate with each other via a data direct VCC 41.

A brief description of the process normally performed to enable a LEC will now be presented. Initially, the LEC sends a configuration request message to the LECS to request to join an ELAN and obtain the ATM address of the LES for its ELAN. The message is sent over a bidirectional P2P Configure Direct VCC to the LECS. Using the same VCC, the LECS returns, via a configuration response message, the ATM address and the name of the LES for the ELAN associated with the LEC.

The LEC then sets up a bidirectional P2P Control Direct VCC to the LES associated with its ELAN for the purpose of exchanging control traffic. Once a Control Direct VCC is established between a LEC and LES, it remains up. The LEC then attempts to join the ELAN via join request and response messages to and from the LES. The LES for the ELAN sets up a bidirectional P2P Configure Direct VCC to the LECS to verify that the client is permitted to join the ELAN. The configuration request from the LES contains the MAC address of the LEC, its ATM address and the name of the ELAN. The LECS checks its database and determines if the LEC can join that particular ELAN. It uses the same VCC to reply to the LES whether the LEC is or is not permitted to join.

If the join is permitted, the LES adds the LEC to the unidirectional P2M Control Distribute VCC and confirms the join over the bidirectional P2P Control Direct VCC. If not permitted, the LES rejects the join over the bidirectional P2P Control Direct VCC. The LES sends configuration data, e.g., LEC_ID, ELAN_ID, etc., to the LEC. The LEC then sends LE_ARP packets for the broadcast address that causes VCCs to be set up between the LEC and the BUS entity.

During communications on the ELAN, each LEC builds a local LE_ARP table that maps MAC addresses to ATM addresses. When a LEC first joins an ELAN, its LE_ARP table does not contain any entries and it has no information about destinations on or behind its ELAN. The LEC uses the LE_ARP process to learn about the destination when a packet is to be transmitted, i.e., to find the ATM address corresponding to the known MAC address.

The LEC first sends an LE_ARP request to the LES over the Control Direct VCC. The LES forwards the LE_ARP request to all the LECs on the ELAN over the Control Distribute VCC. Any LEC that recognizes the MAC address responds with its ATM address over the Control Direct VCC. The LES forwards the response over the Control Distribute VCC. The LEC, upon receipt, adds the MAC address/ATM address pair to its LE_ARP cache. The LEC is then able to establish a Data Direct VCC to the desired destination and begin sending packets to the ATM address.

When a LEC wants to transmit broadcast, multicast or unicast traffic with an unknown address, it first sends the packet to the BUS over the Multicast Send VCC. The BUS forwards, i.e., floods, the packet to all LECs over the Multicast Forward VCC. Note that this VCC branches at each ATM switch. The switch is operative to forward the packets to multiple outputs.

Note that in connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are reassigned by the LECS to other active LESs.

As described above, in the LANE Version 1.0 architecture (see FIGS. 1 and 2), the BUS is responsible for handling three types of traffic: broadcast, multicast and unknown unicast. The TV multicast traffic is generated by one or more applications that send their data to a group of receivers. The group of receivers does not include all the clients of the ELAN. For example, these applications include but are not limited to video broadcasting, distribution of data information, e.g., software distribution or push technology, video conferencing, remote learning, etc.

It is expected that these applications will increase in popularity in the near future. Therefore, the amount of multicast traffic is expected to also increase to a large extent. If multicast traffic were to grow, based on the LANE Version 1.0 implementation, the BUS would quickly become a bottleneck for traffic when the total amount of multicast traffic on the ELAN exceeds the forwarding power of the BUS.

Note that it is expected that in the near future Multicast traffic will become very heavy in networks. Broadcast traffic occurs mainly in the startup phase of the network and network elements. Once operating, little continuous broadcast traffic is generated. Similarly, unknown traffic is also not generated on a continuous basis. Unknown traffic is generated, for example, by a network element before a direct connection is established between two network devices.

In addition, multicast traffic is currently handled as broadcast traffic. All multicast traffic defaults to the BUS (to the LES for unicast traffic). In other words, regardless of the size and membership of the multicast group, a multicast message is broadcast to all the LECs and all members attached to the LECs.

To summarize, the disadvantage of LANE Version 1.0 is (1) the lack of true multicast capability (multicast is treated as broadcast) and (2) the lack of redundancy (if a LES or BUS fails the entire ELAN goes down). In particular, multicast traffic is limited by the forwarding capability of the BUS and by the slowest downlink to a LEC. Further, in switched edge device, all multicast traffic is distributed to all the ports.

Since, however, up till now relatively little multicast traffic was generated, the redundancy problem was considered far more important. Today, however, and in the near future the increase in multicast traffic generated by applications will cause the first problem, i.e., lack of true multi cast, to become an important problem as well.

The LNNI portion of LANE Version 2.0 addresses these issues by providing a means of off loading the multicast traffic from the BUS. With reference to FIG. 3, this is achieved by the addition of one or more Selective Multicast Servers (SMSs) 48 that are responsible for handling multicast traffic.

A standard prior art SMS (and BUS) is constructed to perform the following functions. SMSs are designed to forward traffic on a packet level as opposed to forwarding traffic on a cell level. SMSs utilize a heavy protocol known as Server Cache Synchronization Protocol (SCSP). In LNNI most of the information between entities, i.e., LES, SMS, LECS, is transferred using this protocol. This protocol is needed to enable the SMS and LES to reside on difference network devices. In addition, SMSs introduce themselves to the LECS and after obtaining the LES(s) from the LECS. After this first introduction they introduce themselves again to the LES(s) themselves. Further, SMSs must forward multicast traffic to the BUS to ensure backward compatibility with non-SMS enabled LECs.

Both the BUS and SMS comprise, among other things, a segmentation and re-assembly (SAR) unit. As described above, a major function (of the SMS is to receive and distribute multicast traffic.

In operation, one or more LECs establish connections to the BUS. Cells forwarded to the BUS from one or more LECs are received and input to the SAR. A re-assembly unit functions to reassemble the cells into packets. The cells are not forwarded until all cells comprising a packet are received. The BUS cannot multiplex different multicast traffic streams on the cell level, thus the requirement for an SAR in prior art BUS entities. It can, however, multiplex on the packet level.

Once all cells making up a packet have arrived, the packet is then segmented into cells and distributed to each receiver, i.e., member, in the particular multicast group associated with the packet.

For traditional LAN traffic, AAL5 is the means used by which Ethernet and Token Ring frames are encapsulated into ATM cells. AAL5, however, does not provide any multiplexing capabilities. This means that cells derived from a particular frame are queued until all have arrived at the SAR before the packet is passed to the segmentation unit and transmitted as cells to the plurality of multicast destinations, i.e., receivers.

Note that in practice, the BUS (and SMS) may be implemented in various devices but typically, it is implemented in ATM switches. More than one BUS and SMS may reside in a network with each BUS and SMS residing on a different switch.

Initially, the LEC requests the LES for a destination for sending multicast traffic. The LES responds with the address of an SMS. The SMS maintains a list of Multicast Media Access Control (MMAC) addresses, wherein each MMAC represents a multicast group. It is possible that several SMSs serve the same MMAC so as to provide load balancing in the event the output demand exceeds any one SMS.

The LESs have knowledge of the locations of the SMSs and the MMACs handled by each. When an LE_ARP_REQ message arrives at a LES from a LEC for a particular MMAC, the LES replies with the ATM address of the BUS (SMS). If the LES does know about any SMSs, it sends the LEC the ATM address of the BUS. Thus, the BUS is the default in the event an SMS cannot be assigned.

In a network with multicast, the sending and receiving functions are independent of each other. In other words multicast connections may involve overlapping LECs or they may involve totally non overlapping LECs. The same LEC may function as a sender and a receiver for a single multicast connection or for multiple multicast connections.

Once the LEC obtains the ATM address of the SMS, it establishes a point to point connection to the SMS. The LEC then sends multicast traffic to the SMS over that connection.

By default, the LEC receives all multicast traffic. In some cases, e.g., LANE Version 2.0 or a LEC in selective multicast mode, the LEC must issue an LE_$_{REGISTER}$_REQ message for a particular MMAC and send it to the LES in order to listen to a particular multicast. The LES, using the LNNI SCSP protocol, instructs the SMS to add the LEC to the point to multipoint connection.

Virtual LANs and LAN Emulation

As described hereinabove, LAN Emulation and 2.0 developed by the ATM Forum function to emulate the services provided by legacy LANs (e.g., 802.3, 802.5, etc.) across the ATM network. LE enables end systems (e.g., workstations, servers, bridges, etc.) to connect to the ATM network while the software applications interact as if they are attached to a traditional LAN. In addition, LE supports the interconnection of ATM networks with legacy LANs by means of well known 802.1D bridging methods.

Recently the IEEE extended the traditional 802.1D bridging standard with the publishing of the 802.1Q standard entitled "Virtual Bridged Local Area Networks," incorporated herein by reference in its entirety, which defines the operation and administration of Virtual LAN (VLAN) topologies within a bridged LAN. The 802.1Q standard enables a single LAN to carry the traffic belonging to multiple VLANs. The association of a frame with a VLAN may be specified explicitly using a tag header that is inserted into the frame or implicitly according to the port on which the frame was received.

Figure 4:
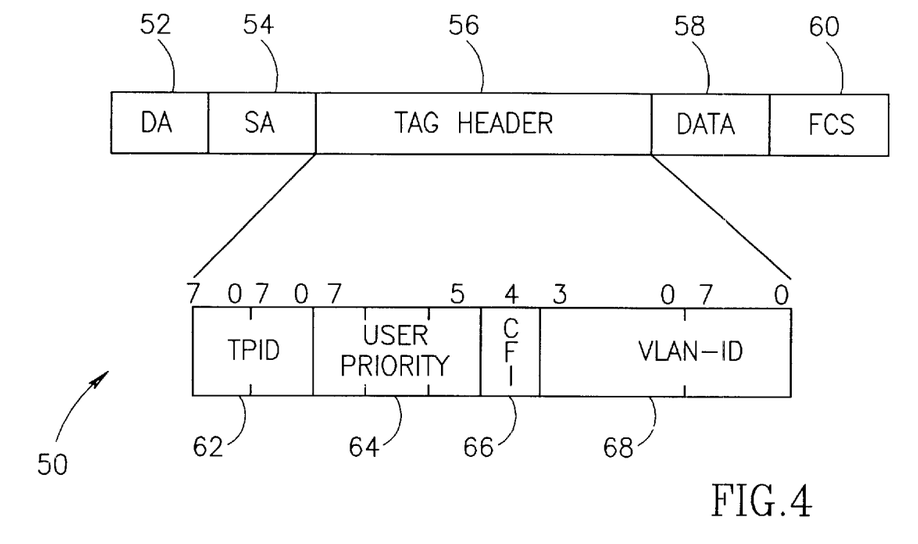
FIG. 4 is a diagram illustrating the structure of an Ethernet frame adapted to include a tag header.

The format of an Ethernet frame having a Tag Header added is shown in FIG. 4. The Ethernet frame, generally referenced 50, comprises a destination address (DA) field 52, a source address (SA) field 54, Tag Header field 56, data field 58 and frame check sequence (FCS) 60. The four byte tag header 56 is inserted after the destination address (DA) and source address (SA) fields (i.e., byte locations 13 through 16). The tag header comprises a two byte Tag Protocol Identifier (TPID) field 62 and a two byte Tag Control Information (TCI) field. The two byte TCI field comprises a three bit user_priority field 64, one bit Canonical Format Indicator (CFI) 66 and a 12 bit VLAN Identifier (VID) field 68.

For use with Ethernet, the TPID field comprises the Ethernet Type value 802.1Qtag Type that identifies a frame as a Tagged Frame. The user_priority field is used to represent 8 priority levels 0 through 7. The CFI bit is a single bit flag value that indicates whether all MAC address information that may be present in the MAC data carried by the frame is in Canonical format. The 12-bit VLAN ID uniquely identifies the VLAN to which the frame belongs. A VLAN tagged frame is a tagged frame whose Tag Header comprises a VID value other than the null VLAN ID.

The main purpose of the bridge is to filter and relay frames between LAN segments by performing the functions described below. Each frame received by the bridge is classified as belonging to one and only one VLAN in accordance with a set of ingress rules. This applies to untagged frames that are deemed as belonging to the VLAN defined by the PVID for the receiving port. Tagged frames received and that are to be submitted to the forwarding process are classified as belonging to the VLAN identified by the VID carried in the tag header.

The bridge makes decisions as to where the frame should be forwarded to in accordance with a set of forwarding rules. Frames are mapped for transmission through the appropriate outbound ports and in the appropriate tagged or untagged format in accordance with a set of egress rules. The bridge also can add, modify and remove tag headers in accordance with the VLAN frame format.

A bridge filters frames in order to prevent the duplication of frames. Thus, frames received by a port on the bridge are not normally forwarded to other ports on the bridge. A bridge filters frames in order to reduce network traffic in certain parts of the bridged LAN that does not lie in the path between the source and destination of the traffic. A function that supports this is the automatic learning of dynamic filtering information by observing the source addresses of bridged LAN traffic and the automatic addition and removal of this information as a result of aging or other processes.

In order to expedite the transmission of frames, the bridge classifies frames into traffic classes. The classes can be defined on the basis of port, MAC address, protocol type or LAN segment. A bridge filters frames in order to confine traffic destined for a particular VLAN to LAN segments that form a path from the source of the traffic to recipients that are members of that VLAN. To do this, bridges have the ability to automatically learn the MAC addresses in associated VLANs through the observation of network traffic. The bridge adds and removes tag headers from frames.

In filtering relaying frames, the bridge makes use of a filtering database (FDB) which it uses to store end station information acquired through the learning process. In port VLAN classification in a bridge, the VID associated with an untagged frame (i.e., a frame with no tag header) is determined based on the port of the bridge the frame was received on. A specific VLAN ID called the Port VLAN Identifier (PVID) is associated with each port of the bridge. The PVID for a particular port provides the VID for untagged frames received through that port. The filtering process takes into consideration: (1) the destination MAC address within a received frame, (2) the VID associated with the received frame and (3) the information contained in the Filtering Database for that MAC address and VID.

The learning process observes the source MAC addresses of frames received on each port and updates the filtering database accordingly. The VID of the frame is used to ensure that the address information is learnt relative to the VLAN of the frame. The learning process is able to determine the port through which particular end stations in the bridged LAN can be reached by inspection of the source MAC address field and VID of received frames: It records this information in the filtering database.

The 802.1Q standard also provides for a variety of approaches to the way that individual MAC addresses are learnt and how this information is used in forwarding/filtering decisions. In Shared VLAN Learning (SVL), the bridge makes use of address information learnt across a number of VLANs in making forwarding/filtering decisions in connection with other VLANs. In Independent VLAN Learning (IVL), the bridge makes use of information learnt in one VLAN only and does not use this information in making forwarding/filtering decisions with any other VLAN.

Thus, in SVL, only one FDB is required and all VLANs share the same learnt MAC address information, regardless of which VLAN the information was learnt in. In IVL, multiple FDBs are required with each FDB supporting only one VID so that each VLAN makes use only of MAC address information learnt within that VLAN.

Figure 5:
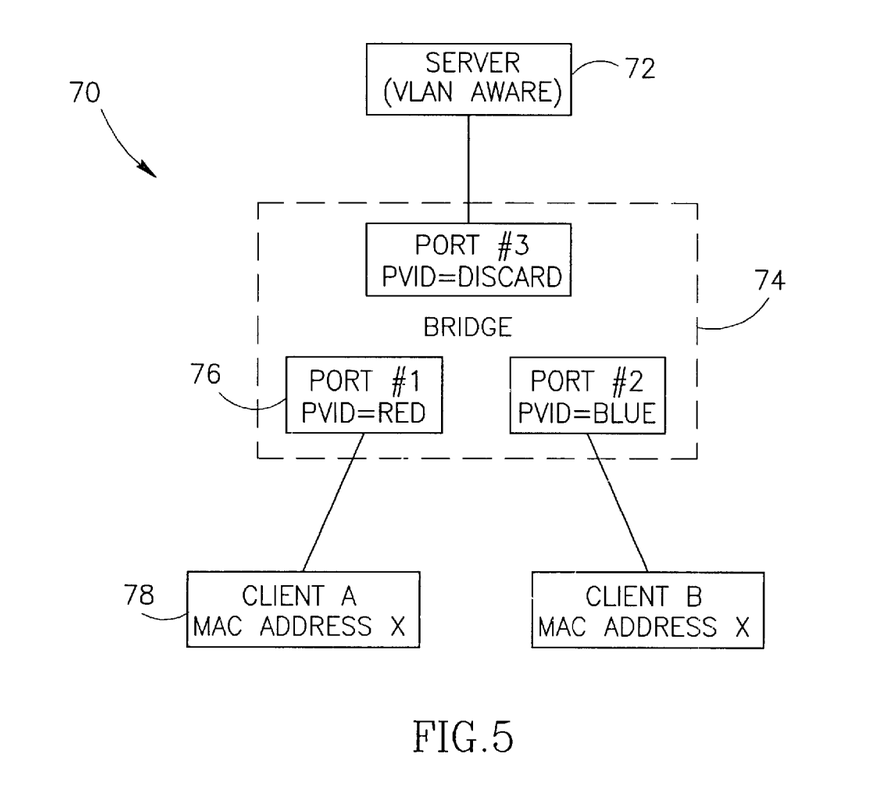
FIG. 5 is a block diagram illustrating an example LAN incorporating two clients that use the same MAC address, both of which communication with the same server.

An example of the need for Independent VLAN Learning is described in connection with FIG. 5. The example network, generally referenced 70, comprises two clients 78, labeled Client A and Client B, a bridge 74 having a plurality of ports 76 and a VLAN aware server 72. In this example, both Client A and Client B are two distinct devices located in different parts of the network that use the same individual MAC address. Alternatively, the same device may be connected to multiple LAN segments wherein all its LAN interfaces use the same individual MAC address.

Both Clients A and B use the same MAC address X and have access to the same server which is VLAN-aware. If the bridge shares learning between VLAN Red (which serves Client A) and VLAN Blue (which serves Client B), i.e., the bridge uses the same FID and FDB for both VLANs, then address X will appear to move between Ports #1 and #2 of the bridge, depending on which client has most recently transmitted a frame. Communication between these clients and the server will be severely disrupted. The assignment, however, of distinct FIDs and hence FDBs for the Red and Blue VLANs ensures that communications can take place correctly. Thus, in this case, IVL is required in the bridge.

A problem arises, however, when Ethernet traffic is directed over ATM networks using standard LAN Emulation techniques as defined in the ATM Forum LAN Emulation standards. More specifically, the problem is that LE does not support Independent VLAN Learning in edge devices. The LE standard does not provide for the creation of multiple instances of the LE_ARP cache table in a LEC entity. In addition, the LE_ARP protocol does not provide a mechanism to associate a given MAC address to a particular VLAN. Consequently, the LE standard cannot support multiple VLANs in Independent VLAN Learning mode (as specified by 802.1Q) to be carried over a single ELAN.

Therefore, in the event an LE_ARP request message is received by two LECs having the same MAC address in the LE_ARP cache on two different VLANs, both LECs will respond. In operation, the LEC sends the LE_ARP messages to all LECs in the ELAN. In the case of IVL, if the same MAC address is being used in two or more filtering databases, then all LECs having that particular MAC address would respond.

Note that in the Shared VLAN Learning mode of operation, this problem does not arise since only one FDB is used. The problem also does not arise with Independent VLAN Learning with a single VLAN, as this is the same case as multiple VLANs with SVL.

SUMMARY OF THE INVENTION

The present invention solves the problems associated with the prior art by providing an apparatus for and a method of extending the LE standard to support 802.1Q VLAN tagging with Independent VLAN Learning. In accordance with the present invention, a standard LEC entity is modified to perform the VLAN tagging method that supports Independent VLAN Learning. Since, in accordance with the LANE standard, the LES may also respond to LE_ARP messages, it is optionally modified to perform the VLAN tagging method of the invention so as to provide support for 802.1Q Independent VLAN Learning. Note that the LEC and LES entities modified to provide support for Independent VLAN Learning retain interoperability with other LAN Emulation clients do not provide such support.

Support for 802.1Q Independent VLAN Learning is provided by adding a VLAN-ID TLV to LAN Emulation control messages such as LE_ARP and LE_REGISTER messages. The TLV added comprises the VLAN Tag Header information that is normally carried by the Ethernet frame in 802.1Q networks. In operation, when an LE_ARP message includes the VLAN-ID TLV, the LEC is adapted to use the LE_ARP cache instance associated with the VLAN-ID in the TLV. If the message received does not include the VLAN-ID TLV, the LEC uses the LE_ARP cache table instance associated with the PVID of the LEC. Similarly, when a tagged data frame is received, the LE_ARP cache associated with the VLAN-ID in the tag header is used. If an untagged frame is received, the LE_ARP cache instance associated with the PVID of the LEC is used. For sending data frames, the VLAN Tag Header is included if the LEC belongs to a tagged set of VLANs. If it belongs to an untagged set of VLANs, the LEC does not include the VLAN Tag Header.

There is provided in accordance with the present invention, in a LAN Emulation over Asynchronous Transfer Mode (ATM) network including at least one Emulation LAN (ELAN), one LAN Emulation Client (LEC) and one 802.1Q compliant bridge, a method of supporting 802.1Q Virtual LAN (VLAN) tagging with Independent VLAN Learning, the method comprising the steps of creating an individual LE_ARP cache table instance for each filtering database maintained by the bridge, wherein each LE_ARP cache table instance created is associated with an individual filtering database and a set of VLANs, associating a Port VLAN Identifier (PVID) with the LEC, including the LEC in tagged and untagged sets of VLANs and including a VLAN-ID TLV in all control messages sent by the LEC.

The method further comprises the step of using the LE_REGISTER request to register MAC addresses with a LAN Emulation Server (LES) entity. The method further comprises the step of using the LE_ARP cache instance associated with the VLAN-ID in the VLAN-ID TLV when learning from or responding to a control message that includes the VLAN-ID TLV. The method further comprises the step of using the LE_ARP cache instance associated with the PVID of the LEC when learning from or responding to a control message that does not include the VLAN-ID TLV. The method further comprises the step of using the LE_ARP cache instance associated with a VLAN-ID when learning from a tagged data frame received over a Data Direct VC. The method further comprises the step of using the LE_ARP cache instance associated with the PVID of the LEC when learning from an untagged data frame received over a Data Direct VC.

The method further comprises the step of including a VLAN Tag Header in a data frame when sending if the LEC belongs to a tagged set of a VLAN. The method further comprises the step of not including a VLAN Tag Header in a data frame when sending if the LEC belongs to an untagged set of a VLAN. The method further comprises the step of passing VLAN-ID related parameters to LEC Upper Layers upon reception by the LEC of a tagged data frame. The control message may comprise an LE_ARP related message or an LE_REGISTER related message. The method further comprises the step of adding the VLAN-ID parameter to LANE Upper Layer Service Interface.

There is also provided in accordance with the present invention, in a LAN Emulation over Asynchronous Transfer Mode (ATM) network including at least one Emulation LAN (ELAN) and one LAN Emulation Server (LES), a method of supporting 802.1Q Virtual LAN (VLAN) tagging with Independent VLAN Learning, the method comprising the steps of creating an individual LE_ARP cache table instance for each VLAN handled by a LES, including a VLAN-ID TLV in all control messages sent by the LES and associating a default VLAN-ID with each LES.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| DETAILED DESCRIPTION OF THE INVENTION | |
|---|---|
| Notation Used Throughout | |
| The following notation is used throughout this document. | |
| Term | Definition |
| AAL | ATM Adaptation Layer |
| ANSI | American National Standards Institute |
| ARP | Address resolution Protocol |
| ATM | Asynchronous Transfer Mode |
| BUS | Broadcast and Unknown Server |
| CCITT | Comite Consulatif International Telegraphique et Telephonique |
| DA | Destination Address |
| DDVC | Data Direct Virtual Connection |
| ELAN | Emulated Local Area Network |
| FCS | Frame Check Sequence |
| FDB | Filtering Database |
| FDDI | Fiber Distributed Data Interface |
| FID | Filtering identifier |
| IISP | Interim Inter-Switch Signaling Protocol |
| IP | Internet Protocol |
| IPX | Internetwork Packet Exchange |
| ITU | International Telecommunications Union |
| IVL | Independent VLAN Learning |
| LAN | Local Area Network |
| LANE | LAN Emulation |
| LE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MMAC | Multicast Media Access Control |
| OUI | Organizational Unit Identifier |
| P2M | Point-to-Multipoint |
| P2P | Point-to-Point |
| PDU | Protocol Data Unit |
| PNNI | Private Network to Network Interface |
| PVC | Permanent Virtual Circuit |
| PVID | Port VLAN Identifier |
| SA | Source Address |
| SAR | Segmentation and Reassembly |
| SCSP | Server Cache Synchronization Protocol |
| SMS | Selective Multicast Server |
| SVC | Switched Virtual Circuit |
| SVL | Shared VLAN Learning |
| TCI | Tag Control Information |
| TLV | Type, Length, Value |
| TPID | Tag Protocol Identifier |
| UNI | User to Network Interface |
| VCC | Virtual Channel Connection |
| VCI | Virtual Circuit Identifier |
| VID | VLAN Identifier |
| VLAN | Virtual Local Area Network |
| VPI | Virtual Path Identifier |

| Definitions Used Throughout | |
|---|---|
| The following definitions are used throughout this document. | |
| Term | Definition |
| Frame | A unit of data transmission on an IEEE 802 LAN MAC that conveys a Protocol Data Unit (PDU) between MAC Service users. There are three types of frame: Untagged, VLAN-Tagged and Priority-Tagged. |

DETAILED DESCRIPTION OF THE INVENTION

| | |
|---|---|
| IVL | Configuration and operation of the Learning Process and the Filtering Database such that, for a given set of VLANs, if a given individual MAC address is learnt in one VLAN, that learnt information is not used in forwarding decisions taken for that address relative to any other VLAN in the given set. |
| SVL | Configuration and operation of the Learning Process and the Filtering Database such that, for a given set of VLANs, if an individual MAC address is learnt in one VLAN, that learnt information is used in forwarding decisions taken for that address relative to all other VLANs in the given set. |
| Tag Header | A Tag Header allows user priority information, and optionally, VLAN identification information, to be associated with a frame. |
| Tagged Frame | A frame that contains a Tag Header immediately following the Source MAC address field of the frame. |
| Untagged Frame | A frame that does not contain a Tag Header immediately following the Source MAC address field of the frame. |
| VLAN | A subset of the active topology of a Bridged Local Area Network. Associated with each VLAN is a VLAN Identifier (VID). |
| VLAN-aware | A property of Bridges or end stations that recognize and support VLAN-Tagged Frames. |
| VLAN-unaware | A property of Bridges or end stations that do not recognize VLAN-Tagged Frames. |

General Description

The present invention solves the problems associated with the prior art by providing an apparatus for and a method of extending the LE standard to support 802.1Q VLAN tagging with Independent VLAN Learning. In accordance with the present invention, a standard LEC entity is modified to perform the VLAN tagging method that supports Independent VLAN Learning. Since, in accordance with the LANE standard, the LES may also respond to LE_ARP messages, it too is modified to perform the VLAN tagging method of the invention so as to provide support for 802.1Q Independent VLAN Learning. Note that the LEC and LES entities modified to provide support for Independent VLAN Learning retain interoperability with other LAN Emulation clients do not provide such support.

Support for 802.1Q Independent VLAN Learning is provided by adding a VLAN-ID TLV to LAN Emulation control messages such as LE_ARP and LE_REGISTER messages. The TLV added comprises the VLAN Tag Header information that is normally carried by the Ethernet frame in 802.1Q networks. Note that the well known LAN Emulation standard provides a mechanism for adding TLVs to most control messages, including LE_ARP and LE_REGISTER messages.

Figure 6:
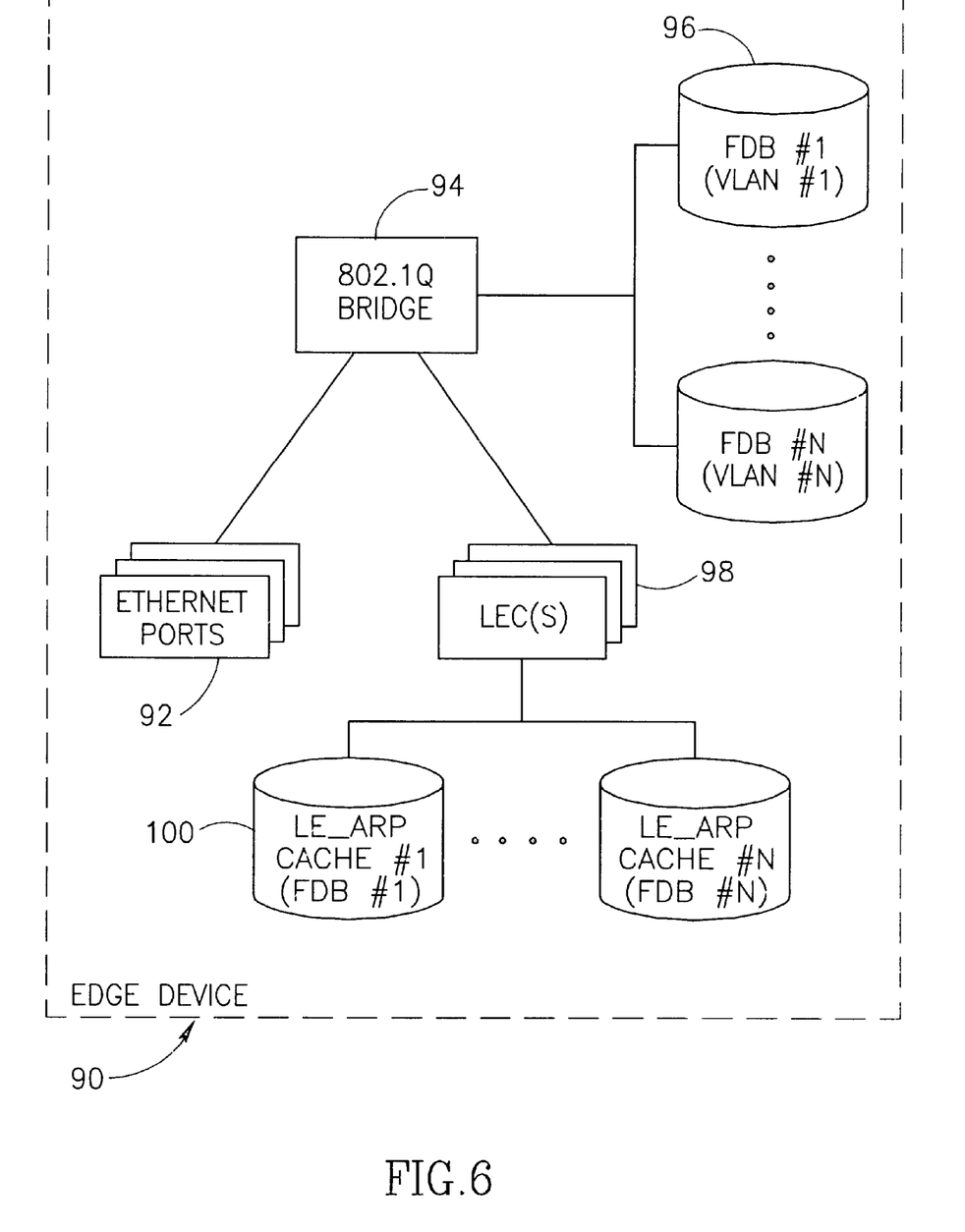
FIG. 6 is a block diagram illustrating an example edge device constructed in accordance with the present invention.

A block diagram illustrating an example edge device constructed in accordance with the present invention is shown in FIG. 6. The edge device, generally referenced 90, comprises a 802.1Q compliant bridge 94, a plurality of Filtering Databases (FDBs) 96, labeled FDB #1 through FDB #N, a plurality of Ethernet ports 92, a plurality of LEC entities 98 and a plurality of LE_ARP cache table instances 98, labeled LE_ARP Cache #1 through LE_ARP Cache #N.

In order to support Independent VLAN Learning in ATM compatible edge devices, multiple instances of the LE_ARP cache table must be created. The Independent VLAN Learning mode of operation in a 802.1Q bridge specifies a particular operation for the learning process and for the filtering database. In particular, a given MAC address that is learnt on one VLAN is not used in determining forwarding decisions for that MAC address in any other VLAN.

To accomplish this, the bridge must maintain individual filtering databases, one for each VLAN. Consequently, since each MAC address may belong to multiple VLANs, each VLAN must be associated with an individual LE_ARP cache table instance in the LEC. The LEC, therefore is adapted to maintain multiple instances of the LE_ARP cache table, with each LE_ARP cache table instance associated with a set of VLANs or, alternatively, a separate LE_ARP cache table for each VLAN.

The bridge is adapted to maintain multiple filtering databases, one for each VLAN. Each filtering database is then mapped to (i.e., associated with) a corresponding LE_ARP cache table. Thus, for N filtering databases, the LEC creates N instances of the LE_ARP cache table, as indicated in FIG. 6.

Note that, in accordance with the present invention, the LES entity (not shown) may also optionally be modified to support 802.1Q Independent VLAN Learning. In this case, the LES is also adapted to maintain a separate individual LE_ARP cache table for each VLAN.

The TLV used in LANE to convey the VLAN tagging information is shown below in Table 1.

TABLE 1

VLAN-ID TLV Structure

| Item | Type | Length | Description |
|---|---|---|---|
| VLAN-ID | XX-XX-XX-YY | 2 Bytes | 802.1Q VLAN-ID as defined in Section 9.3.2 of the 802.1Q Standard |

The Item identifies the TLV as a VLAN-ID TLV. The type is a unique 32-bit value grouped as a 3-byte Organizational Unit Identifier (OUI) with a 1-byte type. The first 3-bytes represent an OUI value defined by the ATM Forum, while the last byte represents the type. In general, the 4-byte field can be any value such that it uniquely defines the TLV among all possible TLVs. For example, the 3-byte code may comprise 02-60-8C (Hex) which is the OUI value assigned to 3Com Corporation while the last byte may be set to 0x01.

The Length specifies a length of two bytes. Note that the first two byte TPID field defined in the 802.1Q standard is not require since the type is already explicitly given. The value assigned to the TLV comprises a three bit user_priority portion, one bit CFI portion and a 12-bit VLAN-ID (VID) portion. The user_priority and CFI fields may be set to zero while the VID is set to the particular VLAN-ID.

VLAN Tagging Method—LEC Entity

Figure 7A:
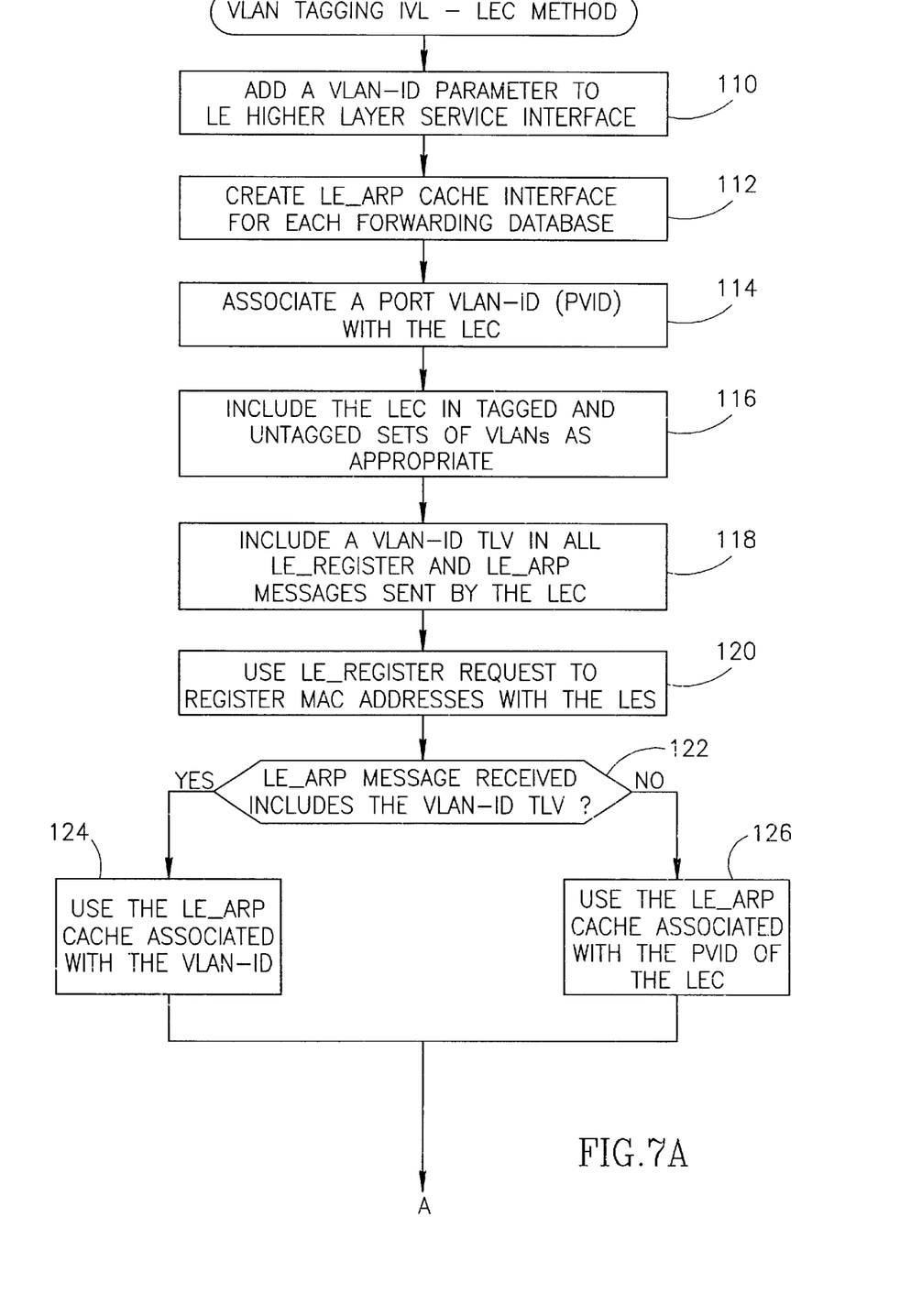
FIGS. 7A and 7B are a flow diagram illustrating the VLAN tagging method supporting IVL for the LEC entity.
Figure 7B:
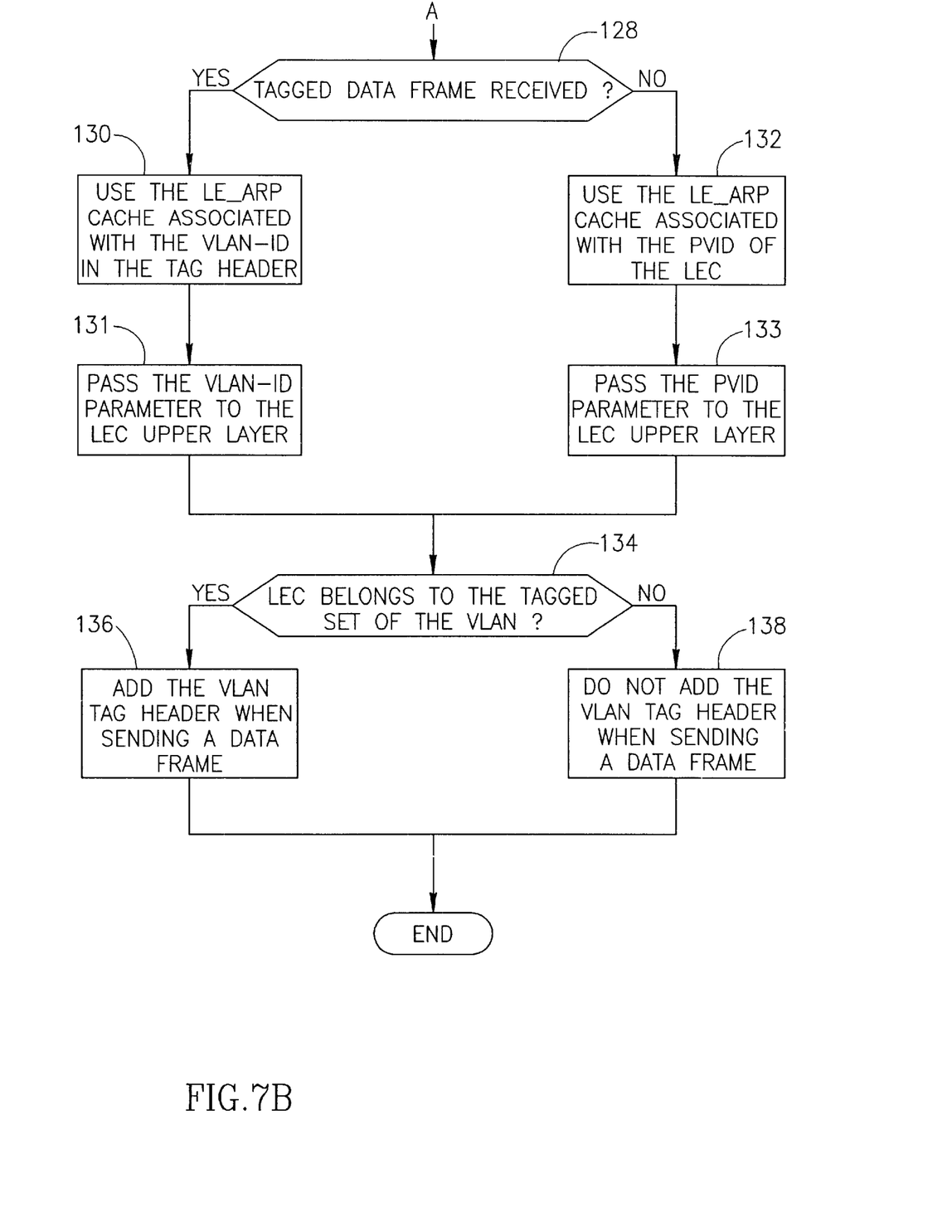

A flow diagram illustrating the VLAN tagging method supporting IVL for the LEC entity is shown in FIGS. 7A and 7B. Preferably, the upper layer interface in the LEC is adapted to support the addition of the TLV containing the VLAN Tag Header information (step 110). Section 3.1 of the LAN Emulation Version 2.0 specification referenced above specifies the service interfaces between the LAN Emulation entity and the Higher Layer, AAL, Connection Management and Layer Management entities. The service interface to these layers are preferably modified to include the VLAN-ID parameter.

For each VLAN, the bridge maintains an individual filtering database. The LEC entity creates a separate LE_ARP cache table instance for each filtering database maintained by the bridge (step 112). The mapping between VLANs and LE_ARP cache table instances should be similar to the mapping of VLANs to filtering databases as defined in the 802.1Q standard.

A Port VLAN-ID (PVID) is then associated with the LEC entity in similar fashion to the association of PVID to the MAC interface as specified in the 802.1Q standard (step 114). As a consequence, frames received over the LEC interface from the ELAN without a VLAN-ID tag are assigned a default VLAN-ID. Note that this is not a second association but should have been configured at the bridge level.

Once the PVID is associated with the LEC entity, the LEC can then be included in both tagged and untagged sets of the various VLANs in the network, as appropriate, in similar fashion to the handling of MAC interfaces specified in the 802.1Q standard (step 116). The LEC entity is therefore treated as a port in the edge device whereby the LEC 'port' is connected to the ELAN established over the ATM network.

The VLAN-ID TLV is included in all control messages sent by the LEC entity, including, but not limited to LE_ARP and LE_REGISTER request and response messages (step 118). In accordance with the present invention, MAC addresses should not be registered during the Join phase of LE operation. This is because the Join Request message does not have a provision for including a TLV. Therefore, the MAC address specified in the Join Request message cannot be associated with a VLAN. Instead, it is preferable to use the LE_REGISTER request message to register a MAC address with the LES since the VLAN-ID TLV is included in these messages (step 120).

In accordance with the LANE standard, the LEC entity learns MAC-ATM bindings and associated TLVs via the LE_ARP mechanism. A LEC learns new entries for its LE_ARP cache by observing the source MAC address of a frame received on a Data Direct VCC and associating that MAC address with the VCC and/or the ATM address of the LEC at the other end of the VCC.

In accordance with the present invention, the LEC maintains individual LE_ARP cache tables for each filtering database (i.e., each VLAN). The LEC must choose the appropriate LE_ARP cache table when learning from or attempting to respond to an LE_ARP message received over a Control Direct VCC. This is accomplished by examining received LE_ARP messages and seeing if they include a VLAN-ID TLV (step 122).

If the LE_ARP message includes the VLAN-ID TLV, the LEC entity uses the LE_ARP cache table associated with the VLAN-ID specified in the message (step 124). This is contrast to the SVL mode of operation whereby one LE_ARP cache table is used for all VLANs. If the LE_ARP message does not include the VLAN-ID TLV, the LEC entity uses the LE_ARP cache table associated with the default Port VLAN Identifier (PVID) previously associated with the LEC (step 126).

Similarly as with frames received over the Control Direct VCC, the LEC must choose the appropriate one of the LE_ARP cache tables when learning a ATM-MAC address binding from a frame received on a Data Direct VCC. This is accomplished by examining the data frame received (step 128). If the data frame received is tagged, i.e., comprises an Ethernet frame with Tag Header Information, then the LEC entity uses the LE_ARP cache table associated with the VLAN-ID specified in the Tag Header (step 130). In addition, when receiving a tagged data frame, the VLAN-ID parameters are passed to the Upper Layers in the LEC entity (step 131).

If the data frame received is untagged, i.e., no Tag Header Information in the Ethernet frame, then the LEC entity uses the LE_ARP cache table associated with the Port VLAN L Identifier associated with the LEC (step 132). In addition, when receiving an untagged data frame, no parameters are passed and the data frame is processed as normal in accordance with the LANE standard (step 133).

Further, when sending a data frame, the Upper Layers (e.g., the Bridge Layer) in the edge device must determine whether Tag Header information is to be included in the frame. This is accomplished by determining whether the LEC belongs to the tagged set of the VLAN (step 134). If the LEC belongs to the tagged set of the VLAN, then the VLAN Tag Header as specified in the 802.1Q standard is sent when sending a data frame (step 136). If the LEC belongs to the untagged set of the VLAN, then VLAN Tag Header information is not sent when sending a data frame (step 138).

VLAN Tagging Method—LES Entity

As specified in the LANE standard, a LES may respond to an LE_ARP request message for a MAC address with the information obtained when that unicast MAC address was previously registered. If the LES does not respond to an LE_ARP for a registered unicast LAN Destination, then it must forward the LE_ARP request message to the LEC that registered that unicast LAN Destination. In order to handle the case when the LES is configured to respond to LE_ARP request messages, the present invention includes a modification to the standard LES to enable the LES to support Independent VLAN Learning in edge devices connected to an ELAN established over an ATM network.

The method performed on the LES is similar to that performed on the LEC with a key difference being that the LES does not operate with a bridge and therefore there are no filtering databases associated therewith. The LES is, however, modified to include a plurality of LE_ARP cache table instances. Each instance of the LE_ARP cache is associated with a single VLAN.

Figure 8:
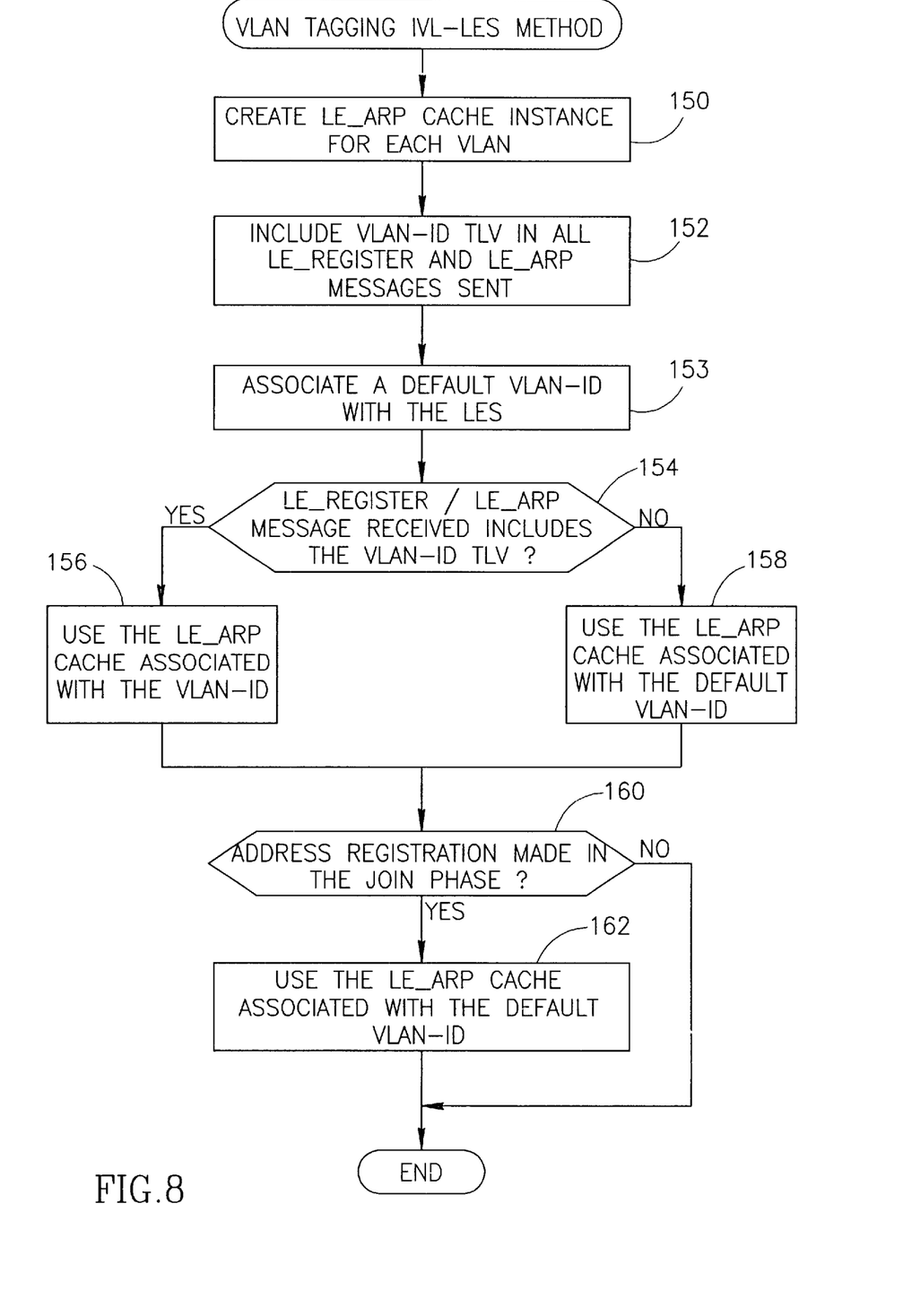
FIG. 8 is a flow diagram illustrating the VLAN tagging method supporting IVL for the LES entity.

A flow diagram illustrating the VLAN tagging method supporting IVL for the LES entity is shown in FIG. 8. First, an instance of the LE_ARP cache table is created for each VLAN handled by the LES (step 150). The VLAN-ID TLV (as described above) is included in all control messages sent by the LES, including but not limited to LE_ARP and LE_REGISTER request and response messages (step 152). A default VLAN-ID parameter is associated with and configured in the LES (i.e., the ELAN) (step 153).

In accordance with the LANE standard, the LES entity learns MAC-ATM bindings and associated TLVs via LE_ARP and LE_REGISTER messages. A LES learns new entries for its LE_ARP cache by observing the source MAC address of messages received on a Control Direct VCC and associating that MAC address with the VCC and/or the ATM address of the corresponding LEC.

In accordance with the present invention, the LES maintains individual LE_ARP cache tables for each VLAN. The LES must choose the appropriate LE_ARP cache table when learning from or attempting to respond to an LE_ARP message received over a Control Direct VCC. This is accomplished by examining the LE_ARP message received and seeing if it includes a VLAN-ID TLV (step 154).

If the LE_ARP or LE_REGISTER message includes-the VLAN-ID TLV, the LES entity uses the LE_ARP cache table associated with the VLAN-ID associated with the VLAN-ID in the VLAN-ID TLV portion of the message (step 156). If the LE_ARP or LE_REGISTER message does not include the VLAN-ID TLV, the LES entity uses the LE_ARP cache table associated with the default VLAN-ID previously configured for the ELAN (step 158).

In the case when an address registration was previously made in the Join phase (step 160), then the LE_ARP cache table instance that is associated with the default VLAN-ID is used (step 162).

Note that the operation of the methods of the present invention does not require modification to the LECS or the BUS entities in the network. Note also that a LEC that does not support the features of the present invention, simply ignores the VLAN-ID TLV. In this case, all frames transmitted and received by such a LEC are associated with the default VLAN-ID of the ELAN. Note further that the maximum frame size to enable the transmission of frames that include a VLAN Tag Header is already supported by the ATM Forum LANE Version 2.0 standard.

While the invention has been described with respect to a limited number of embodiments, it will be appreciated that many variations, modifications and other applications of the invention may be made.

What is claimed is:

1. In a LAN Emulation over Asynchronous Transfer Mode (ATM) network including at least one Emulation LAN (ELAN), one LAN Emulation Client (LEC) and one 802.1Q compliant bridge, a method of supporting 802.1Q Virtual LAN (VLAN) tagging with Independent VLAN Learning, said method comprising the steps of:

creating an individual LE_ARP cache table instance for each filtering database maintained by said bridge, wherein each LAN Emulation Address Resolution Protocol (LE_ARP) cache table instance created is associated with an individual filtering database and a set of VLANs;

associating a Port VLAN Identifier (PVID) with said LEC;

including said LEC in tagged and untagged sets of VLANs; and including a VLAN-ID Type, Length, Value (TLV) in all control messages sent by said LEC.

2. The method according to claim 1, further comprising the step of using the LE_REGISTER request message to register Media Access Control (MAC) addresses with a LAN Emulation Server (LES) entity.

3. The method according to claim 1, further comprising the step of using the LE_ARP cache instance associated with the VLAN-ID in said VLAN-ID TLV when learning from or responding to a control message that includes said VLAN-ID TLV.

4. The method according to claim 1, further comprising the step of using the LE_ARP cache instance associated with said PVID of said LEC when learning from or responding to a control message that does not include said VLAN-ID TLV.

5. The method according to claim 1, further comprising the step of using the LE_ARP cache instance associated with a VLAN-ID when learning from a tagged data frame received over a Data Direct Virtual Connection (VC).

6. The method according to claim 1, further comprising the step of using the LE_ARP cache instance associated with the PVID of said LEC when learning from an untagged data frame received over a Data Direct View Connection (VC).

7. The method according to claim 1, further comprising the step of including a VLAN Tag Header in a data frame when sending if said LEC belongs to a tagged set of a VLAN.

8. The method according to claim 1, further comprising the step of not including a VLAN Tag Header in a data frame when sending if said LEC belongs to an untagged set of a VLAN.

9. The method according to claim 1, further comprising the step of passing VLAN-ID related parameters to LEC Upper Layers upon reception by said LEC of a tagged data frame.

10. The method according to claim 1 wherein said control message comprises an LE_ARP related message.

11. The method according to claim 1, wherein said control message comprises an LE_REGISTER related message.

12. The method according to claim 1, further comprising the step of adding said VLAN-ID parameter to LAN Emulation (LANE) Upper Layer Service Interface.

13. The method according to claim 1, further comprising the step of using the LE_ARP cache instance associated with said default VLAN-ID when learning from or responding to a control message that does not include said VLAN-ID TLV.

14. The method according to claim 1, further comprising the step of using the LE_ARP cache instance associated with the default VLAN-ID when an address registration was established during a Join phase.

15. In a LAN Emulation over Asynchronous Transfer Mode (ATM) network including at least one Emulation LAN (ELAN) and one LAN Emulation Server (LES), a method of supporting 802.1Q Virtual LAN (VLAN) tagging with Independent VLAN Learning, said method comprising the steps of:

creating an individual LAN Emulation Address Resolution Protocol (LE_ARP) cache table instance for each VLAN handled by a LES;

including a VLAN-ID Type, Length, Value (TLV) in all control messages sent by said LES; and associating a default VLAN-ID with each said LES.

16. The method according to claim 15, further comprising the step of using the LE_ARP cache instance associated with the VLAN-ID in a VLAN-ID TLV when learning from or responding to a control message that includes a VLAN-ID TLV.

17. The method according to claim 15 wherein said control message comprises an LE_ARP related message.

18. The method according to claim 15, wherein said control message comprises an LE_REGISTER related message.

* * * * *